United States Patent
Tarantino et al.

(10) Patent No.: US 11,021,237 B2
(45) Date of Patent: Jun. 1, 2021

(54) AIRCRAFT HYDRAULIC SYSTEM

(71) Applicant: AIRBUS OPERATIONS LIMITED, Bristol (GB)

(72) Inventors: Alessio Tarantino, Bristol (GB); Peter Keenan, Bristol (GB)

(73) Assignee: Airbus Operations Limited, Bristol (GB)

(*) Notice: Subject to any disclaimer, the term of this patent is extended or adjusted under 35 U.S.C. 154(b) by 71 days.

(21) Appl. No.: 16/259,186

(22) Filed: Jan. 28, 2019

(65) Prior Publication Data

US 2019/0233086 A1     Aug. 1, 2019

(30) Foreign Application Priority Data

Jan. 29, 2018   (GB) ..................... 1801429

(51) Int. Cl.
*B64C 13/40*    (2006.01)
*B64C 25/22*    (2006.01)
(Continued)

(52) U.S. Cl.
CPC .............. *B64C 13/40* (2013.01); *B64C 13/42* (2013.01); *B64C 25/22* (2013.01); *B64C 25/42* (2013.01);
(Continued)

(58) Field of Classification Search
CPC ....... B64C 13/40; B64C 25/405; B64C 25/22; B64C 25/42; F15B 13/027;
(Continued)

(56) References Cited

U.S. PATENT DOCUMENTS 5,284,083 A * 2/1994 Vaslin ................. B64C 25/22
                                                                60/406
5,343,703 A * 9/1994 Kamimura ............ B64C 13/505
                                                                60/403
(Continued)

FOREIGN PATENT DOCUMENTS

EP     0 265 761     5/1988
EP     1 218 241     7/2002
(Continued)

OTHER PUBLICATIONS

European Search Report cited in EP 19154061.6 dated Jul. 1, 2019, 7 pages.

*Primary Examiner* — Dustin T Nguyen
(74) *Attorney, Agent, or Firm* — Nixon & Vanderhye P.C.

(57) ABSTRACT

A sub-system 200 for an aircraft hydraulic system 20 that includes a first inlet 202 for receiving fluid from a supply 22 of hydraulic fluid, a system valve 210 for controlling fluid flow from the sub-system 200 to a hydraulically-operable system 24 of the aircraft hydraulic system 20, a check valve 220 for permitting fluid flow from the sub-system 200 and preventing or hindering fluid flow into the sub-system 200, a second inlet 240 for receiving fluid from a second supply 28 of hydraulic fluid, and a selector 230. The selector 230 configured to place the system valve 210 in fluid communication with the first inlet 202 when the selector 230 is in a first state, and to place the system valve 210 in fluid communication with the check valve 220 and the second inlet 240 when the selector 230 is in a second state different from the first state.

17 Claims, 5 Drawing Sheets

(51) Int. Cl.
*F15B 13/02* (2006.01)
*B64C 25/42* (2006.01)
*F15B 21/047* (2019.01)
*B64C 13/42* (2006.01)
*F15B 13/042* (2006.01)
*B64C 13/00* (2006.01)

(52) U.S. Cl.
CPC .......... *F15B 13/027* (2013.01); *F15B 21/047* (2013.01); *B64C 13/00* (2013.01); *F15B 13/042* (2013.01); *F15B 2211/40576* (2013.01); *F15B 2211/5156* (2013.01); *F15B 2211/555* (2013.01); *F15B 2211/8609* (2013.01)

(58) Field of Classification Search
CPC .......... F15B 2211/30505; F15B 21/047; F15B 2211/8609; F15B 2211/555
See application file for complete search history.

(56) References Cited

U.S. PATENT DOCUMENTS

| | | | | |
|---|---|---|---|---|
| 6,966,614 | B2 * | 11/2005 | Hamzeh | B64C 25/22 303/10 |
| 9,169,001 | B2 * | 10/2015 | Hansen | F15B 11/17 |
| 10,106,248 | B2 * | 10/2018 | Boucher | B64C 25/22 |
| 2018/0339766 | A1 * | 11/2018 | Didey | B64C 25/34 |

FOREIGN PATENT DOCUMENTS

| | | |
|---|---|---|
| EP | 3 165 455 | 5/2017 |
| WO | 01/25087 | 4/2001 |
| WO | 2016/138865 | 9/2016 |
| WO | 2017/125108 | 7/2017 |

\* cited by examiner

AIRCRAFT HYDRAULIC SYSTEM

RELATED APPLICATION

This application claims priority to United Kingdom patent application GB1801429.0 filed Jan. 29, 2018, the entirety of which is incorporated by reference.

TECHNICAL FIELD

The present invention relates to a sub-system for an aircraft hydraulic system, an aircraft hydraulic system, and a method to help maintain fluid pressure in a sub-system of an aircraft hydraulic system

BACKGROUND

An aircraft hydraulic system may comprise one or more sub-systems for operating particular mechanisms of the aircraft, such as an aircraft landing gear, aircraft brakes and flight controls. Such sub-systems may be in use for only a portion of an operational time of the aircraft hydraulic system. In some instances, when a sub-system is not in use, it is isolated from the rest of the aircraft hydraulic system, for example by an isolation valve.

Isolation of a sub-system can help to reduce or avoid leakage of hydraulic fluid, to protect the system from unrequired operation, for example in a safety critical scenario, and help to reduce the size of components required in the aircraft hydraulic system, thus helping to reduce the overall weight of the aircraft hydraulic system.

Aircraft hydraulic systems make use of check valves to allow flow of hydraulic fluid over the check valve in a flow direction, and to inhibit or prevent flow of hydraulic fluid over the check valve in an opposite direction to the flow direction. Such check valves help to reduce or prevent excessive leakage of hydraulic fluid from the aircraft hydraulic system and to reduce or prevent back flows that could damage equipment that works only with flow in one direction.

SUMMARY

A first aspect of the present invention provides a sub-system for an aircraft hydraulic system, the sub-system comprising a first inlet for receiving fluid from a supply of hydraulic fluid a system valve for controlling fluid flow from the sub-system to a hydraulically-operable system of the aircraft hydraulic system, a check valve for permitting fluid flow from the sub-system and preventing or hindering fluid flow into the sub-system, a second inlet for receiving fluid from a second supply of hydraulic fluid, and a selector configured to place the system valve in fluid communication with the first inlet when the selector is in a first state, and to place the system valve in fluid communication with the check valve and the second inlet when the selector is in a second state different from the first state.

Optionally, the second inlet is between the selector and the check valve.

Optionally, the system valve is a servo valve.

Optionally, the selector is configured to isolate the system valve from the check valve and the second inlet when the selector is in the first state. Optionally, the selector is configured to isolate the system valve from the first inlet when the selector is in the second state.

A second aspect of the present invention provides an aircraft hydraulic system comprising a sub-system according to the first aspect of the present invention, a supply of hydraulic fluid to supply hydraulic fluid to the first inlet of the sub-system, a first hydraulically-operable system to receive hydraulic fluid from the sub-system via the system valve when the system valve is open, and a second supply of hydraulic fluid to supply hydraulic fluid to the second inlet of the sub-system.

Optionally, the second supply of hydraulic fluid comprises a return line of the aircraft hydraulic system.

Optionally, the second supply of hydraulic fluid comprises a return line of a pressure limiting valve of the aircraft hydraulic system.

Optionally, the second supply of hydraulic fluid comprises a return line of a second hydraulically-operable system of the aircraft hydraulic system, different from the first hydraulically-operable system. Optionally, the second hydraulically-operable system is a hydraulic system for use in the event that the first hydraulically-operable system fails.

Optionally, the first hydraulically-operable system is an aircraft braking system.

A third aspect of the present invention provides a sub-system for an aircraft hydraulic system, the sub-system comprising an outlet valve configured to selectively permit a flow of hydraulic fluid out of the sub-system, an isolation valve configured to permit a flow of hydraulic fluid to flow to the outlet valve from a supply line when the isolation valve is in a first position, and to isolate the outlet valve from the supply line when the isolation valve is in a second position different from the first position, a non-return valve configured to permit hydraulic fluid to flow from the sub-system and to prevent or hinder hydraulic fluid from flowing into the sub-system, and an inlet line configured to receive a flow of hydraulic fluid into the sub-system from a supply, wherein, when the isolation valve is in the first position, the outlet valve is isolated from the non-return valve and the inlet line, and, when the isolation valve is in the second position, the outlet valve is in fluid communication with the non-return valve and the inlet line.

A fourth aspect of the present invention provides an aircraft comprising a sub-system according to the first aspect or the third aspect of the present invention, or an aircraft hydraulic system according to the second aspect of the present invention.

A fifth aspect of the present invention provides a method to help maintain fluid pressure in a sub-system of an aircraft hydraulic system, the method comprising closing a system valve, the system valve for controlling fluid flow from the sub-system to a hydraulically-operable system of the aircraft hydraulic system, moving a selector from a first position to a second position, wherein, in the first position, the selector is configured to place the system valve in fluid communication with a first inlet for receiving fluid into the sub-system from a supply of hydraulic fluid, and, in the second position, the selector is configured to place the system valve in fluid communication with a check valve and a second inlet, the check valve for permitting fluid flow from the sub-system and preventing or hindering fluid flow into the sub-system, and receiving hydraulic fluid into the sub-system via the second inlet from a supply of hydraulic fluid, when the selector is in the second position.

Optionally, the receiving hydraulic fluid comprises receiving hydraulic fluid into the sub-system via the second inlet from a return line of the aircraft hydraulic system.

Optionally, a pressure of hydraulic fluid received at the first inlet is greater than a pressure of hydraulic fluid received at the second inlet.

BRIEF DESCRIPTION OF THE DRAWINGS

Embodiments of the invention will now be described, by way of example only, with reference to the accompanying drawings, in which.

DETAILED DESCRIPTION

Throughout this application the term "isolation valve" is used to describe a valve configured to isolate a portion of a hydraulic system from another portion of the hydraulic system. The term "isolation valve" is used interchangeably with the term "selector". The term "check valve" is used to describe a valve that permits a flow of fluid in one direction over the valve and prevents or inhibits flow in the opposite direction. The term "check valve" is used interchangeably with the term "non-return valve".

Sub-systems of aircraft hydraulic systems can be isolated from a supply of hydraulic fluid when the sub-system is not in use. In an open position of an isolation valve, hydraulic fluid is permitted to flow from the supply of hydraulic fluid of the aircraft hydraulic system into the sub-system. In a closed position of the isolation valve, flow of hydraulic fluid from the supply of hydraulic fluid into the sub-system is prevented or significantly restricted.

In some aircraft hydraulic systems, the isolation of a sub-system of the aircraft hydraulic system can lead to a pressure in the sub-system that is lower than a normal operating pressure of the sub-system. For example, when closure of an isolation valve causes a line downstream of the isolation valve having a sealed end (e.g. defined by a closed valve) to be connected to a return port via a check valve, hydraulic fluid surges across the check valve causing a rapid decrease in the volume of hydraulic fluid in the line. The decrease in volume of hydraulic fluid in the line causes the pressure in the line to fall, which may result in the formation of gas vapour. Such a line will remain in a low pressure state until the isolation valve is opened again and hydraulic fluid is permitted to flow into the line from the hydraulic supply. The sudden increase in line pressure associated with opening of the isolation valve may cause implosion of vapour bubbles, which may damage components of the sub-system such as valves in close proximity to the vapour. Damage to such components may result in failure of the sub-system and/or may reduce the working life of components of the sub-system, thus potentially increasing maintenance and through-life costs of the sub-system.

The formation of vapour due to rapid pressure decrease in a hydraulic system can be reduced by the installation of an appropriately sized hydraulic accumulator on the line, or by avoiding the hydraulic system having a sealed line when an isolation valve is closed. However, the use of hydraulic accumulators may lead to an increase in system weight, cost and complexity. Hydraulic accumulators would also require additional maintenance activities, such as gas pre-charge check and refill (if required). In some instances, it is not possible to avoid the use of check valves (which result in a sealed line) to avoid the detrimental effects of hydraulic fluid reverse flow from a return network, or to protect the system from pipe ruptures and subsequent hydraulic leakages. The present invention therefore seeks to provide an alternative way to help prevent the formation of vapour in a hydraulic system.

Figure 1:
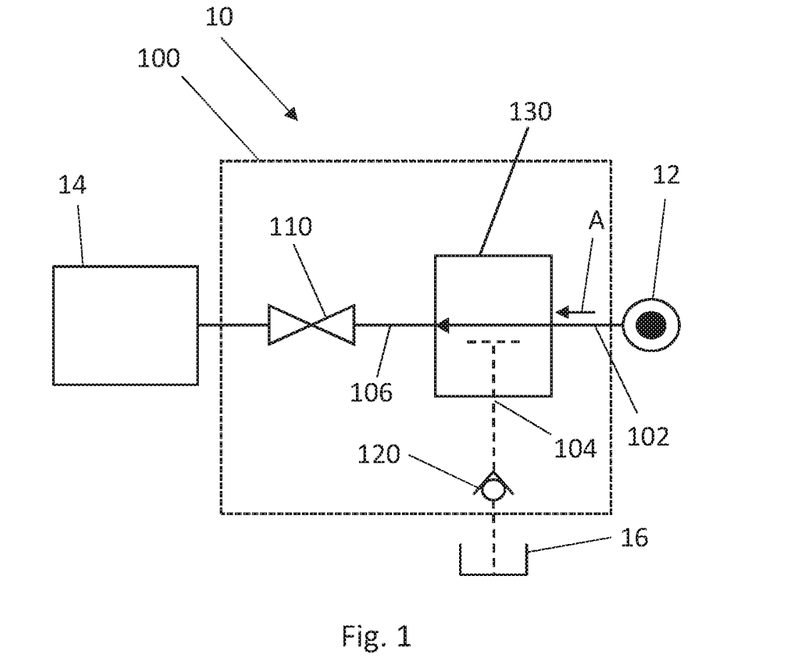
FIG. 1 shows a schematic view of a sub-system of an aircraft hydraulic system in an activated state.
Figure 2:
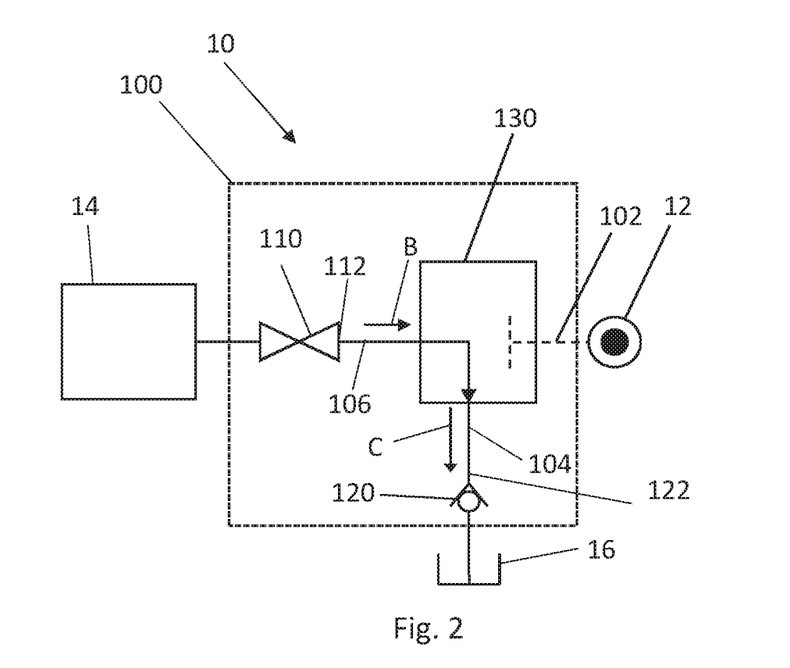
FIG. 2 shows a schematic view of the sub-system of FIG. 1 in an isolated state.

FIGS. 1 and 2 show a comparative sub-system 100 of an aircraft hydraulic system 10. The system comprises a first inlet 102 for receiving hydraulic fluid from a supply 12 of hydraulic fluid, a system valve 110 for controlling fluid flow from the sub-system 100 to a hydraulically-operable system 14 of the aircraft hydraulic system 10, a check valve 120 for permitting fluid flow from the sub-system 100 and preventing or hindering fluid flow into the sub-system 100, and an isolation valve 130 configured to place the system valve 110 in fluid communication with the first inlet 102 when the isolation valve 130 is in a first position, as shown in FIG. 1, and to place the system valve 110 in fluid communication with the check valve 120 when the isolation valve 130 is in a second position, as shown in FIG. 2. FIGS. 1 and 2 show that the check valve 120 connects the sub-system 100 to a reservoir 16 for hydraulic fluid. In other systems, the check valve 120 may be connected to other components of the aircraft hydraulic system 10. The pressure of the hydraulic fluid at the first inlet 102 is greater than the pressure of hydraulic fluid in the reservoir 16.

As shown in FIG. 1, when the isolation valve 130 is in the first position, hydraulic fluid is permitted to flow from the supply 12 of hydraulic fluid to the system valve 110 via the first inlet 102 in a direction denoted by arrow A. The hydraulic fluid is prevented by the isolation valve 130 from flowing from the isolation valve 130 to the check valve 120 along the hydraulic line 104 extending between the isolation valve 130 and the check valve 120, as denoted by the dashed hydraulic line 104.

As shown in FIG. 2, when the isolation valve 130 is in the second position, the hydraulic fluid from the supply 12 of hydraulic fluid is prevented from entering the sub-system 100 via the first inlet 102, as denoted by the dashed line 102. When the isolation valve 130 is in the second position, the system valve 110 is placed in fluid communication with the check valve 120 so that hydraulic fluid may flow along the hydraulic lines 104 and 106 in a direction denoted by arrows B and C. The check valve 120 is configured to allow hydraulic fluid to flow along the hydraulic line 104 in a direction C from the isolation valve 130 towards the reservoir 16, and to prevent or hinder hydraulic fluid from flowing in the opposite direction.

When the isolation valve 130 is moved from the first position to the second position, the volume of hydraulic fluid in the hydraulic lines 104, 106 may drop rapidly as hydraulic fluid flows across the check valve 120 without any hydraulic fluid entering the hydraulic lines 104, 106. Hydraulic fluid flows across the check valve 120 because the pressure in the lines 104, 106 is greater than the hydraulic pressure beyond the check valve 120 (i.e. in the reservoir 16 in the arrangement shown in FIGS. 1 and 2) when the isolation valve 130 is moved from the first position to the second position. In some arrangements, the pressure in the hydraulic lines 104, 106 may drop to a pressure that is lower than a pressure beyond the check valve 130. The drop in pressure can result in the formation of vapour in the hydraulic lines 104, 106, particularly in the hydraulic line 106 between the system valve 110 and the isolation valve 130, more particularly near the system valve 110. The speed at which the isolation valve 130 is moved from the first position to the second position may be proportional to the rate of pressure drop in the hydraulic lines 104, 106, and the rate of pressure drop may be proportional to the amount of vapour produced in the hydraulic lines 104, 106.

Figure 3:
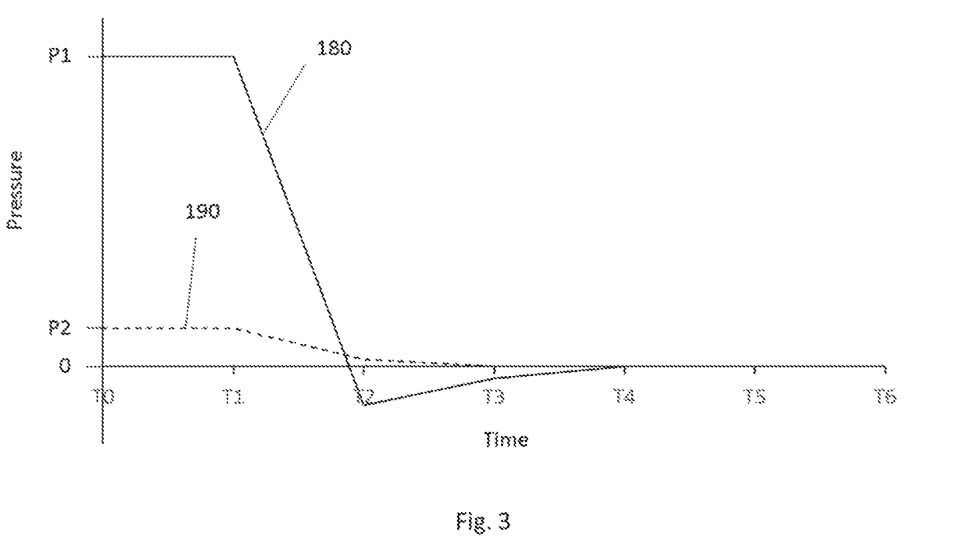
FIG. 3 is a graph showing a drop in pressure in the sub-system of FIG. 1 when the sub-system goes from the activated state to the isolated state.

FIG. 3 is a graph showing in a simplified manner how the pressure in the hydraulic lines 104, 106 drops when the isolation valve 130 is moved from the first position to the second position. The solid line 180 denotes the fluid pressure at the system valve 110 on the side in fluid communication with the isolation valve 130, at point 112 in FIG. 2, and the dashed line 190 denotes the fluid pressure at the check valve 120 on the side in fluid communication with the isolation valve 130, at point 122 in FIG. 2. At time T0, the isolation valve 130 is in the first position. The fluid pressure at the system valve 110 is the pressure P1 of the hydraulic fluid supplied to the sub-system 100 via the first inlet 102. The fluid pressure at the check valve 120 is the return pressure P2 of the sub-system 100, that is, at or about the pressure P2 in the reservoir 16.

At time T1, the isolation valve 130 is moved from the first position to the second position. In the scenario shown in FIG. 3, the fluid pressure at the check valve 120 drops to around zero. In other examples, the fluid pressure P2 at the check valve 120 may drop from pressure P2 to a pressure that is greater than zero. In the scenario shown in FIG. 3, the fluid pressure at the system valve 110 drops rapidly from pressure P1 to below zero as hydraulic fluid surges from the system valve 110, along the hydraulic lines 104, 106 connecting the system valve 110 to the check valve 120, and across the check valve 120. After time T2, the pressure at the system valve 110 and the check valve 120 substantially equalises and remains constant until the isolation valve 130 is moved from the second position to the first position. This can cause the formation of gas vapour in the hydraulic lines 104, 106 between the system valve 110 and the check valve 120, typically at the highest point in the hydraulic lines 104, 106.

Figure 4:
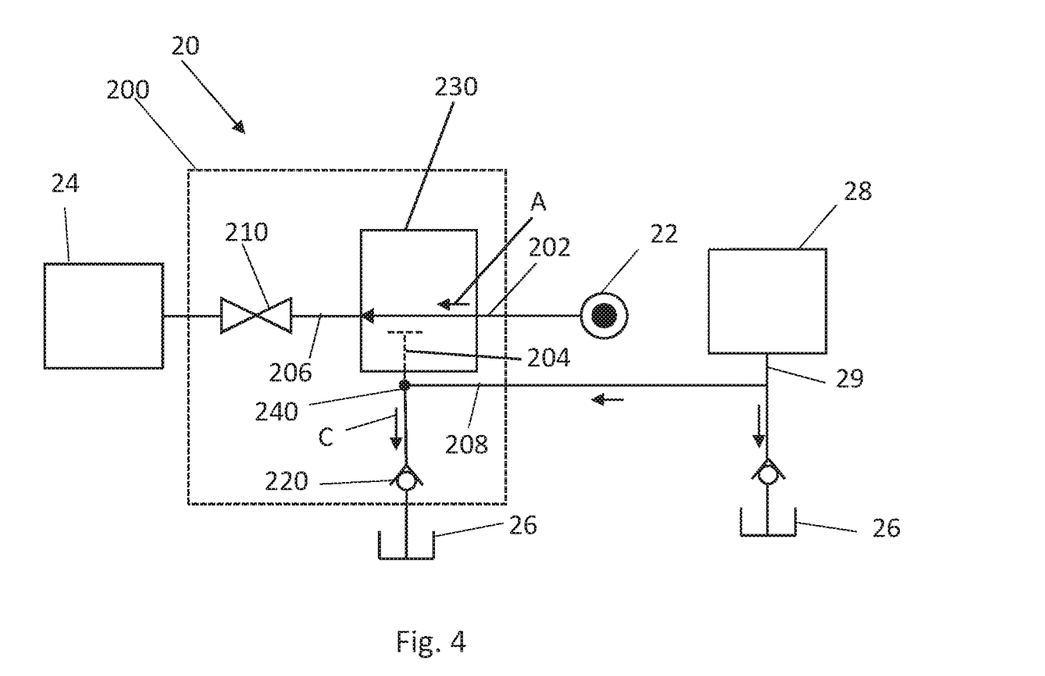
FIG. 4 shows a schematic view of a sub-system of an aircraft hydraulic system in an activated state according to an embodiment of the present invention.
Figure 5:
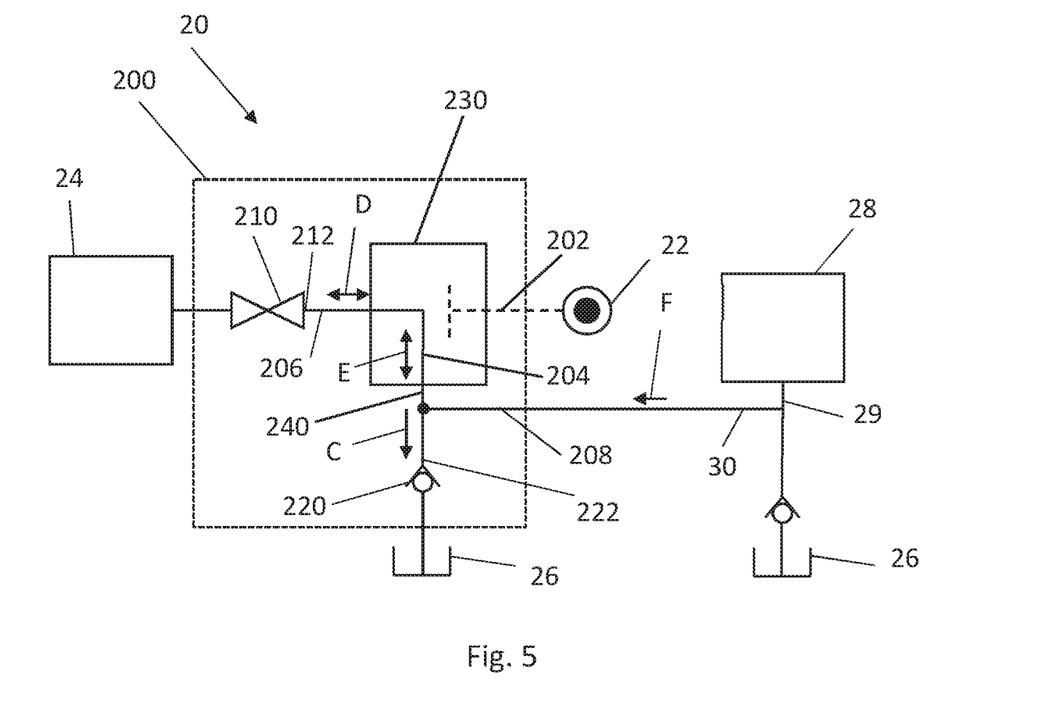
FIG. 5 shows a schematic view of the sub-system of FIG. 4 in an isolated state.

FIGS. 4 and 5 show a sub-system 200 of an aircraft hydraulic system 20 according to an embodiment of the present invention. The sub-system 200 comprises a first inlet 202 for receiving fluid from a supply 22 of hydraulic fluid, a system valve 210 for controlling fluid flow from the sub-system 200 to a hydraulically-operable system 24 of the aircraft hydraulic system 20, a check valve 220 for permitting fluid flow from the sub-system 200 and preventing or hindering fluid flow into the sub-system 200, a second inlet 240 for receiving fluid from a second supply 28 of hydraulic fluid, and a selector 230 configured to place the system valve 210 in fluid communication with the first inlet 202 when the selector 230 is in a first state, and to place the system valve 210 in fluid communication with the check valve 220 and the second inlet 240 when the selector 230 is in a second state.

Hydraulic fluid received at the first inlet 202 is at a higher pressure than hydraulic fluid received at the second inlet 240.

FIGS. 4 and 5 show that the check valve 220 connects the sub-system 200 to a reservoir 26 for hydraulic fluid. In other systems, the check valve 220 may be connected to other components of the aircraft hydraulic system 20. In the embodiments shown in FIGS. 4 and 5, the second inlet 240 is between the selector 230 and the check valve 220, along the hydraulic line 204. In other embodiments, the second inlet 240 may be positioned elsewhere, for example at the selector 230.

In some embodiments, the system valve 210 is a servo valve, configured to move from an open position to a closed position to selectively control fluid flow from the sub-system 200 to the hydraulically-operable system 24 of the aircraft hydraulic system 20, when the selector 230 is in the first state. In other embodiments, the system valve 210 could be other than a servo valve. Any component that acts as a dead end in the hydraulic line 206, for example a second selector, a shuttle valve and an actuator. In a closed position, the system valve 210 isolates parts of the aircraft hydraulic system 20 that are upstream of the system valve 210 from parts of the aircraft hydraulic system 20 that are downstream of the system valve 210.

In some embodiments, the selector 230 is configured to isolate the system valve 210 from the check valve 220 and the second inlet 240 when the selector 230 is in the first state. In some embodiments, the selector 230 is configured to isolate the system valve 210 from the first inlet 202 when the selector 230 is in the second state.

FIG. 4 shows the sub-system 200 when the selector 230 is in the first state. Hydraulic fluid is permitted to flow from the supply 22 of hydraulic fluid along the first inlet 202 and to the system valve 210 via the selector 230 in a direction denoted by arrow A. The hydraulic fluid is prevented by the selector 230 from flowing from the first inlet 202 to the check valve 220. Hydraulic fluid is supplied to the hydraulic line 204 extending between the selector 230 and the check valve 220 from the second inlet 240, and flows through the check valve 220 in a direction denoted by arrow C. Thus, the pressure in the hydraulic line 204 is substantially equal to the pressure in hydraulic line 208 connecting the second supply 28 of hydraulic fluid to the second inlet 240. In some embodiments, the second supply 28 comprises a second hydraulically-operable system of the aircraft hydraulic system 20 and the sub-system 200 is configured to receive hydraulic fluid at the second inlet 240 from the second hydraulically-operable system.

FIG. 5 shows the sub-system 200 when the selector 230 is in the second state. The hydraulic fluid from the supply 22 of hydraulic fluid is prevented from entering the sub-system 200 via the first inlet 202, as denoted by the dashed line 202. When the selector 230 is in the second state, the system valve 210 is placed in fluid communication with the check valve 220 and the second inlet 240 so that hydraulic fluid may flow along the hydraulic lines 204 and 206 in a direction denoted by arrows D and E. The check valve 220 is configured to allow hydraulic fluid to flow along the hydraulic line 204 in a direction C from the second inlet 240 and across the check valve 220, and to prevent or hinder hydraulic fluid from flowing in the opposite direction.

When the selector 230 is moved from the first state to the second state, the hydraulic fluid in the hydraulic lines 204, 206 may surge towards the check valve 220 because the pressure in the lines 204, 206 is greater than the hydraulic pressure beyond the check valve 220 (i.e. in the reservoir 26 in the examples shown in FIGS. 4 and 5) when the selector 230 is moved from the first state to the second state, which could result in the pressure at the second inlet 240 being momentarily less than that in the reservoir 26 after the check valve 220. However, the hydraulic lines 204, 206 are refilled as a result of hydraulic fluid being received in the sub-system 200 via the second inlet 240, thus restoring the pressure in the hydraulic lines 204, 206 until the pressure is substantially equal to the pressure beyond the check valve 220. Providing hydraulic fluid to the hydraulic lines 204, 206 via the second inlet 240 when the selector 230 is in the second state helps to prevent the formation of vapour in the hydraulic lines 204, 206 and thus helps to prolong the life of components of the sub-system 200.

In some embodiments, the hydraulically-operable system 24 is a brake actuator, and the hydraulically-operable system 24 and the sub-system 200 are comprised in an aircraft braking system of the aircraft hydraulic system 20. Typically, the aircraft braking system is isolated from the aircraft hydraulic system 20 by the selector 230 of the sub-system 200 during flight until commencement of a landing procedure. In other embodiments, the hydraulically-operable system 24 and the sub-system 200 may be comprised in any other hydraulic system of the aircraft hydraulic system.

In some embodiments, as shown in FIGS. 4 and 5, the second inlet 240 is configured to receive fluid from a return line 29 of the second supply 28. Fluid flows along the return line 29 in a direction denoted by arrow F. A suitable return line 29 has a substantially constant fluid flow and pressure during operation of the aircraft hydraulic system 20 and therefore can reliably provide hydraulic fluid to the second inlet 240. The return line 29 originates outside the sub-system 200, and in some embodiments may terminate at the reservoir 26. In embodiments in which the sub-system 200 is comprised in an aircraft braking system, the return line 29 may originate in the aircraft braking system, but outside the sub-system 200.

In some embodiments, the second inlet 240 is configured to receive fluid from a return line 29 of a pressure limiting valve (not shown) of the aircraft hydraulic system. For example, the second supply 28 of hydraulic fluid may comprise a pressure limiting valve.

In some embodiments, the second inlet 240 is configured to receive fluid from a return line 29 of a second hydraulically-operable system (not shown) of the aircraft hydraulic system 20. For example, the second supply 28 of hydraulic fluid may comprise an alternate hydraulically-operable system comprising the return line 29. In some embodiments, the alternate hydraulically-operable system is an alternate hydraulic system for use in the event that the hydraulically-operable system 24 fails. For example, in embodiments wherein the hydraulically-operable system 24 is an aircraft braking system, the alternate hydraulically-operable system may comprise an accumulator configured to operate the brakes in the event that the aircraft braking system fails. A return line of the alternate hydraulically-operable system may be connected to the second inlet 240 to provide fluid to the sub-system 200.

Figure 6:
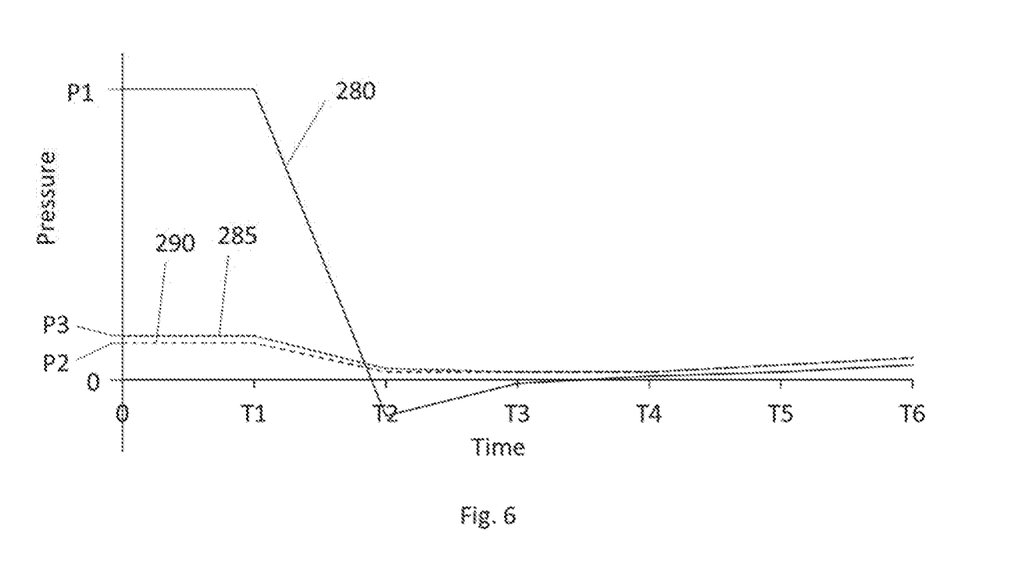
FIG. 6 is a graph showing a drop in pressure in the sub-system of FIG. 4 when the sub-system goes from the activated state to the isolated state.

FIG. 6 is a graph showing in a simplified manner how the pressure in the hydraulic lines 204, 206 changes when the selector 230 is moved from the first state to the second state. In the graph shown in FIG. 6, the second supply 28 of hydraulic fluid comprises a pressure limiting valve. The line 280 denotes the fluid pressure at the system valve 210 on the side in fluid communication with the selector 230, at point 212 as shown in FIG. 5, the line 285 denotes the fluid pressure at the return line 29 on the side in fluid communication with the second inlet 240, at point 30 in FIG. 5, and the line 290 denotes the fluid pressure at the check valve 220 on the side in fluid communication with the selector 230 at point 222, as shown in FIG. 5.

At time T0, the selector 230 is in the first state. The fluid pressure at the system valve 210 is the pressure P1 of the hydraulic fluid supplied to the sub-system 200 via the first inlet 202. The fluid pressure at the check valve 220 is the return pressure P2 of the sub-system 200, that is, at or about the pressure P2 in the reservoir 26. The fluid pressure at the return line 29 is the pressure limiting valve return pressure P3, which is greater than the return pressure P2.

At time T1, the selector 230 is moved from the first state or state to the second state or state. In the example shown in FIG. 6, the fluid pressure at the check valve 220 drops from pressure P2, but does not drop as far as in the system shown in FIGS. 1-3. The fluid pressure at the return line 29 also drops from pressure P3 as fluid is drawn across the check valve 220. The fluid pressure at the system valve 210 drops rapidly from pressure P1 to below zero as hydraulic fluid surges from the system valve 210, along the hydraulic lines 204, 206 connecting the system valve 210 to the check valve 220, and across the check valve 220. After time T2, the pressure at the system valve 210 increases as fluid is drawn from the return line 29 via the second inlet 240 into the hydraulic lines 204, 206. Over time, the pressure at the system valve 210 and the check valve 230 increases to pressure P2 and the pressure at the return line 29 increases to pressure P3 as the pressure in the system equalises. The configuration shown in FIGS. 4 and 5 helps to avoid or lessen the amount of vapour created in the hydraulic line 206 between the system valve 210 and the selector 230.

Figure 7:
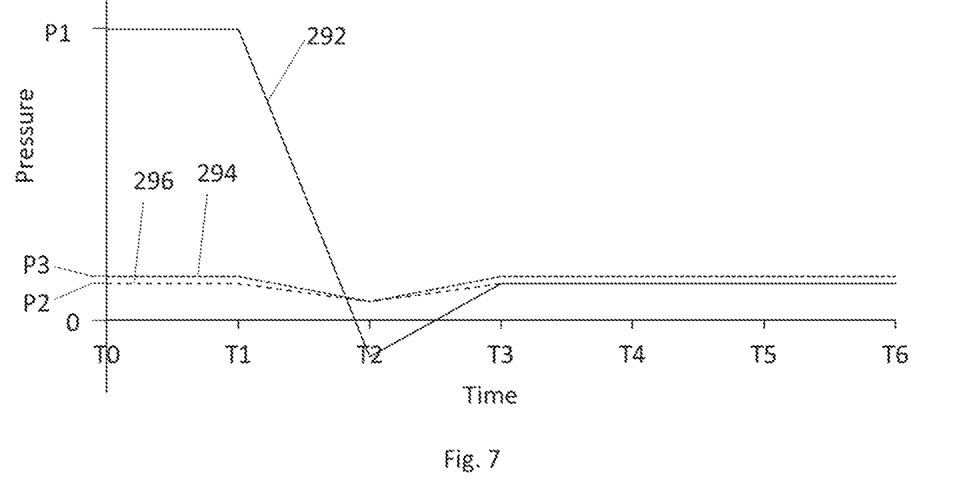
FIG. 7 is a graph showing a drop in pressure in the sub-system of FIG. 4 when the sub-system goes from the activated state to the isolated state.

Whereas the graph of FIG. 6 depicts a system in which the second supply 28 of hydraulic fluid comprises a pressure limiting valve, the graph of FIG. 7 depicts a system in which the second supply 28 of hydraulic fluid comprises a hydraulically-operable system of the aircraft hydraulic system 20. As can be seen by comparing FIGS. 6 and 7, the pressure in the sub-system 20 is equalised at a faster rate in embodiments of the invention in which the second supply 28 of hydraulic fluid comprises a hydraulically-operable system of the aircraft hydraulic system 20, as compared to embodiments in which the second supply 28 of hydraulic fluid comprises a pressure limiting valve. This can be explained by the difference in volume of available pressurised hydraulic fluid in the return line 29, which may be at substantially the same pressure as the pressure in the reservoir 26. In embodiments in which the second supply 28 of hydraulic fluid comprises a hydraulically-operable system of the aircraft hydraulic system 20, a greater volume of fluid is available, meaning that fluid is received at the second inlet 240 at a faster rate compared to embodiments in which the second supply 28 of hydraulic fluid comprises a pressure limiting valve.

FIG. 7 is a graph showing a simplified example of how the pressure in the hydraulic lines 204, 206 changes when the isolation valve 230 is moved from the first state to the second position. In the graph shown in FIG. 7, the second supply 28 of hydraulic fluid comprises a hydraulically-operable system of the aircraft hydraulic system 20. The line 292 denotes the fluid pressure at the system valve 210, for example at point 212 as shown on FIG. 5, the line 294 denotes the fluid pressure at the return line 29, for example at point 30 as shown on FIG. 5, and the line 296 denotes the fluid pressure at the check valve 220, for example at point 222 as shown on FIG. 5.

At time T0, the isolation valve 230 is in the first state. The fluid pressure at the system valve 210 is the pressure P1 of the hydraulic fluid supplied to the sub-system 200 via the first inlet 202. The fluid pressure at the check valve 220 is the return pressure P2 of the sub-system 200, that is, the pressure P2 in the reservoir 26. The fluid pressure at the return line 29 is the pressure limiting valve return pressure P3, which is greater than the return pressure P2.

At time T1, the isolation valve 230 is moved from the first state to the second position. In the example shown in FIG. 7, the fluid pressure at the check valve 220 drops from pressure P2, but does not drop as far as in the system shown in FIGS. 1-3 or as far as in embodiments in which the second supply 28 of hydraulic fluid comprises a pressure limiting valve. The fluid pressure at the return line 29 also drops from pressure P3 as fluid is drawn across the check valve 220, does not drop as far as in embodiments in which the second supply 28 of hydraulic fluid comprises a pressure limiting valve. The fluid pressure at the system valve 210 drops rapidly from pressure P1 to below zero as hydraulic fluid surges from the system valve 210, along the hydraulic lines 204, 206 connecting the system valve 210 to the check valve 220, and across the check valve 220. After time T2, the pressure at the system valve 210 increases as fluid is drawn from the return line 29 via the second inlet 240 into the hydraulic lines 204, 206. At time T3, the pressure in the system has equalised so that the pressure at the system valve 210 and the check valve 230 has increased to pressure P2 and the pressure at the return line 29 has increased to pressure P3.

Embodiments of the present invention provide a sub-system for an aircraft hydraulic system. The sub-system comprises: an outlet valve configured to selectively permit a flow of hydraulic fluid out of the sub-system, an isolation valve configured to permit a flow of hydraulic fluid to flow to the outlet valve from a supply line when the isolation valve is in a first position, and to isolate the outlet valve from the supply line when the isolation valve is in a second position different from the first position, a non-return valve configured to permit hydraulic fluid to flow from the sub-system and to prevent or hinder hydraulic fluid from flowing into the sub-system, and an inlet line configured to receive a flow of hydraulic fluid in to the sub-system from a supply. When the isolation valve is in the first position, the outlet valve is isolated from the non-return valve and the inlet line, and, when the isolation valve is in the second position, the outlet valve is in fluid communication with the non-return valve and the inlet line.

Figure 8:
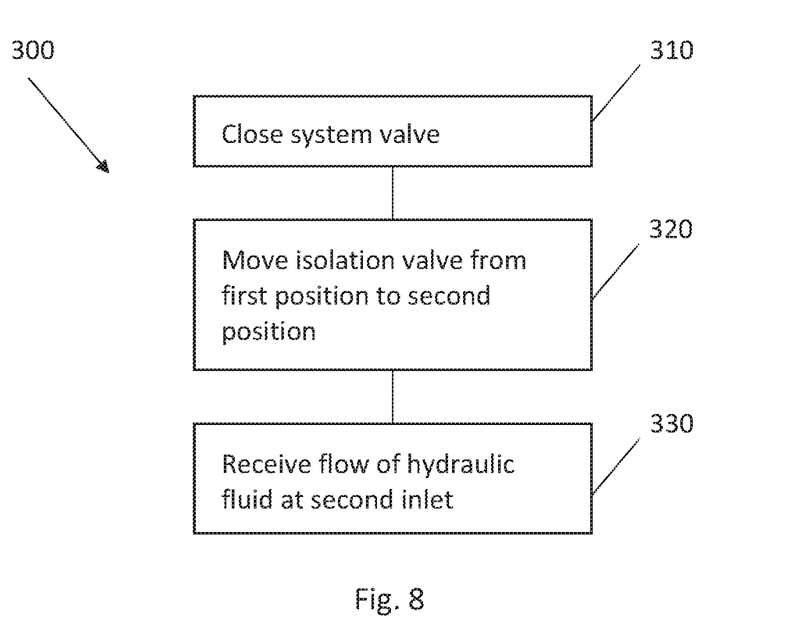
FIG. 8 is a flow diagram showing an example of a method according to an embodiment of the present invention.

Embodiments of the present invention comprise a method 300 to help maintain fluid pressure in a sub-system of an aircraft hydraulic system, as shown in FIG. 8. The method 300 comprises: closing 310 a system valve, the system valve for controlling fluid flow from the sub-system to a hydraulically-operable system of the aircraft hydraulic system, moving 320 a selector from a first position to a second position, wherein, in the first position, the selector is configured to place the system valve in fluid communication with a first inlet for receiving fluid into the sub-system from a supply of hydraulic fluid, and, in the second position, the selector is configured to place the system valve in fluid communication with a check valve and a second inlet, the check valve for permitting fluid flow from the sub-system and preventing or hindering fluid flow into the sub-system, and receiving 330 a flow of hydraulic fluid into the sub-system via the second inlet from a supply of hydraulic fluid, when the selector is in the second position. In some embodiments, the sub-system is a sub-system 200 according to the invention, as described herein.

In some embodiments, the method comprises receiving a flow of hydraulic fluid into the sub-system via the second inlet from a return line of the aircraft hydraulic system. For example, the return line may be a return line of a pressure limiting valve or a return line of an alternate hydraulically-operated system.

In some embodiments, a pressure of hydraulic fluid received at the first inlet is greater than a pressure of hydraulic fluid received at the second inlet.

Some embodiments of the present invention comprise an aircraft hydraulic system 20 comprising: a sub-system according to the present invention; a supply 22 of hydraulic fluid to supply hydraulic fluid to the first inlet 202 of the sub-system, a first hydraulically-operable system 24 to receive hydraulic fluid from the sub-system via the system valve 210 when the system valve 210 is open, a second supply 28 of hydraulic fluid to supply hydraulic fluid to the second inlet 240 of the sub-system.

In some embodiments, the second supply 28 of hydraulic fluid comprises a return line of the aircraft hydraulic system 20. The second supply 28 of hydraulic fluid may comprise a return line of a pressure limiting valve of the aircraft hydraulic system 20. The second supply 28 of hydraulic fluid may comprise a return line of a second hydraulically-operable system of the aircraft hydraulic system 20, different from the first hydraulically-operable system 24. In some embodiments, the second hydraulically-operable system is a hydraulic system for use in the event that the first hydraulically-operable system 24 fails.

In some embodiments, the first hydraulically-operable system 24 is an aircraft braking system.

Figure 9:
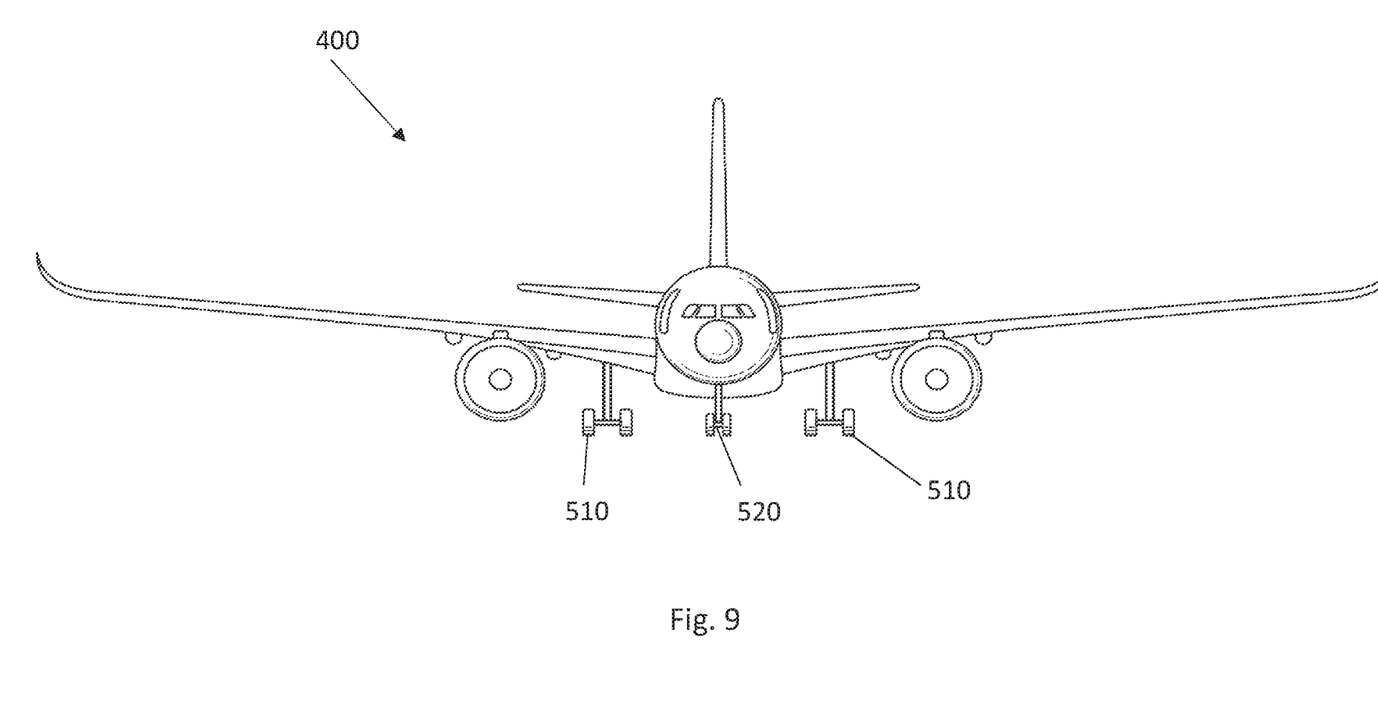
FIG. 9 is a schematic front view of an example of an aircraft according to an embodiment of the present invention.

Some embodiments of the present invention provide an aircraft 400, as shown in FIG. 9. In some embodiments, the aircraft comprises one or more main landing gears 510 and a nose landing gear 520, each comprising one or more wheels. In some embodiments, the aircraft 500 comprises an aircraft hydraulic system comprising a sub-system according to any of the embodiments described herein, for example sub-system 200. Some embodiments of the invention provide an aircraft 400 configured to perform a method 300 according to any of the embodiments described herein.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A sub-system for an aircraft hydraulic system, the sub-system comprising:
   a first inlet configured to receive fluid from a supply of hydraulic fluid;
   a system valve configured to control fluid flow from the sub-system to a hydraulically-operable system of the aircraft hydraulic system;
   a check valve configured to permit fluid flow from the sub-system and configured to prevent or hinder fluid flow into the sub-system;

a second inlet configured to receive fluid from a second supply of hydraulic fluid; and an isolation valve configured to place the system valve in fluid communication with the first inlet when the isolation valve is in a first state, and to place the system valve in fluid communication with the check valve and the second inlet when the isolation valve is in a second state different from the first state, wherein the second inlet is between the isolation valve and the check valve.

2. The sub-system according to claim 1, wherein the system valve is a servo valve.

3. The sub-system according to claim 1, wherein the isolation valve is configured to isolate the system valve from the check valve and the second inlet when the isolation valve is in the first state.

4. The sub-system according to claim 1, wherein the isolation valve is configured to isolate the system valve from the first inlet when the isolation valve is in the second state.

5. An aircraft hydraulic system, comprising:
the sub-system according to claim 1;
the supply of hydraulic fluid is configured to supply hydraulic fluid to the first inlet of the sub-system;
a first hydraulically-operable system to receive the hydraulic fluid from the sub-system via the system valve when the system valve is open; and
the second supply of hydraulic fluid is configured to supply hydraulic fluid to the second inlet of the sub-system.

6. The aircraft hydraulic system according to claim 5, wherein the second supply of hydraulic fluid comprises a return line of the aircraft hydraulic system.

7. The aircraft hydraulic system according to claim 6, wherein the second supply of hydraulic fluid comprises a return line of a pressure limiting valve of the aircraft hydraulic system.

8. The aircraft hydraulic system according to claim 6, wherein the second supply of hydraulic fluid comprises a return line of a second hydraulically-operable system of the aircraft hydraulic system, different from the first hydraulically-operable system.

9. The aircraft hydraulic system according to claim 8, wherein the second hydraulically-operable system is a hydraulic system for use in the event that the first hydraulically-operable system fails.

10. The aircraft hydraulic system according to claim 5, wherein the first hydraulically-operable system is an aircraft braking system.

11. An aircraft comprising a sub-system according to claim 1.

12. A sub-system for an aircraft hydraulic system, the sub-system comprising:
an outlet valve configured to selectively permit a flow of hydraulic fluid out of the sub-system;
an isolation valve configured to permit a flow of hydraulic fluid to flow to the outlet valve from a supply line when the isolation valve is in a first position, and to isolate the outlet valve from the supply line when the isolation valve is in a second position different from the first position;
a non-return valve configured to permit hydraulic fluid to flow from the sub-system and to prevent or hinder hydraulic fluid from flowing into the sub-system; and
an inlet line configured to receive a flow of hydraulic fluid into the sub-system from a supply, wherein, when the isolation valve is in the first position, the outlet valve is isolated from the non-return valve and the inlet line, and, when the isolation valve is in the second position, the outlet valve is in fluid communication with the non-return valve and the inlet line.

13. A method to help maintain fluid pressure in a sub-system of an aircraft hydraulic system, the method comprising:
closing a system valve, the system valve is configured to control fluid flow from the sub-system to a hydraulically-operable system of the aircraft hydraulic system;
moving an isolation valve from a first position to a second position, wherein, in the first position, the isolation valve is configured to place the system valve in fluid communication with a first inlet for receiving fluid into the sub-system from a supply of hydraulic fluid, and, in the second position, the isolation valve is configured to place the system valve in fluid communication with a check valve and a second inlet, the check valve for permitting fluid flow from the sub-system and preventing or hindering fluid flow into the sub-system; and
receiving hydraulic fluid into the sub-system via the second inlet from a return line of the aircraft hydraulic system, when the isolation valve is in the second position.

14. The method according to claim 13, wherein a pressure of hydraulic fluid received at the first inlet is greater than a pressure of hydraulic fluid received at the second inlet.

15. A subsystem for an aircraft hydraulic system comprising:
a first inlet configured to receive fluid from a first supply passage of hydraulic fluid;
a system valve configured to control hydraulic fluid flow from the subsystem to a hydraulically-operable system of the aircraft hydraulic system;
a check valve configured to permit hydraulic fluid flow from the subsystem and suppress hydraulic fluid flow into the subsystem;
a second inlet configured to receive hydraulic fluid from a second supply passage of hydraulic fluid; and
an isolation valve configured to:
(i) permit hydraulic fluid flow from the first inlet to the system valve, while the isolation valve is in a first state, and,
(ii) suppress hydraulic fluid flow from the first inlet to the system valve, and permit hydraulic fluid flow between the system valve and both the check valve and the second inlet, while the isolation valve is in a second state,
wherein the isolation valve is switchable between the first and second states.

16. The subsystem of claim 15, wherein the first supply passage is connected to a first reservoir of hydraulic fluid, and the second supply passage is connected to a second reservoir of hydraulic fluid.

17. The subsystem of claim 15, wherein the isolation valve, while in the first state, is configured to suppress hydraulic fluid flow from the first inlet towards the check valve and second inlet.

* * * * *